(12) United States Patent
Mighell

(10) Patent No.: US 8,925,940 B2
(45) Date of Patent: *Jan. 6, 2015

(54) TILTING WHEELED VEHICLE

(71) Applicant: Robert Mighell, Stanwood, WA (US)

(72) Inventor: Robert Mighell, Stanwood, WA (US)

(73) Assignee: Tilting Motor Works, Inc., Marysville, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/716,056

(22) Filed: Dec. 14, 2012

(65) Prior Publication Data
US 2013/0207363 A1   Aug. 15, 2013

Related U.S. Application Data

(63) Continuation of application No. 13/460,282, filed on Apr. 30, 2012, now abandoned, which is a continuation
(Continued)

(51) Int. Cl.
| | | |
|---|---|---|
| *B62K 5/05* | (2013.01) | |
| *B62D 9/02* | (2006.01) | |
| *B62K 5/027* | (2013.01) | |
| *B62K 5/08* | (2006.01) | |
| *B62K 5/10* | (2013.01) | |
| *B62D 9/04* | (2006.01) | |

(52) U.S. Cl.
CPC . *B62D 9/02* (2013.01); *B62K 5/027* (2013.01); *B62K 5/05* (2013.01); *B62K 5/08* (2013.01); *B62K 5/10* (2013.01); *B62D 9/04* (2013.01); *B60G 2300/122* (2013.01); *B60G 2300/45* (2013.01)
USPC ............ 280/124.103; 280/5.509; 180/210

(58) Field of Classification Search
CPC ............ B62K 5/05; B62K 5/027; B62K 5/10

USPC ............ 180/41, 210; 280/124.111–124.113, 280/124.134–124.136, 124.138, 124.157, 280/141, 124.103, 124.126, 5.509
See application file for complete search history.

(56) References Cited

U.S. PATENT DOCUMENTS 1,041,097 A    10/1912  Kennedy
1,954,361 A *   4/1934  Lewter ........................ 280/402
(Continued)

FOREIGN PATENT DOCUMENTS

| DE | 3546073 A1 | 7/1987 |
| GB | 2407541 A * | 5/2005 |
| WO | WO 2005002957 A1 * | 1/2005 |

OTHER PUBLICATIONS

Final Office action mailed Nov. 7, 2008, U.S. Appl. No. 11/507,040, filed Sep. 18, 2006, Inventor Robert Mighell.
(Continued)

*Primary Examiner* — James English
(74) *Attorney, Agent, or Firm* — Lane Powell PC

(57) ABSTRACT

A tilting, preferably three-wheeled, vehicle is disclosed that has a tilting mechanism that allows the vehicle to have leaning characteristics substantially similar to those offered by an in-line two-wheeled vehicle, but that does not require complex linkages and/or control systems to operate effectively. A tilting linkage is operably secured to a frame to allow a pair of spaced apart wheels to remain substantially aligned with the plane of the vehicle throughout its range of movement while still allowing the steering axes of each wheel to intersect the substantially vertical centerline of each wheel. The linkage also allows the caster angle of each wheel's pivot axis can be optimized independently of the angle of the vehicle's handlebar steering shaft.

9 Claims, 13 Drawing Sheets

Related U.S. Application Data of application No. 13/235,344, filed on Sep. 16, 2011, now abandoned, and a continuation-in-part of application No. 13/169,719, filed on Jun. 27, 2011, now abandoned, which is a continuation of application No. 12/367,683, filed on Feb. 9, 2009, now Pat. No. 7,967,306, which is a continuation of application No. 11/507,040, filed on Aug. 18, 2006, now Pat. No. 7,487,985.

(60) Provisional application No. 60/711,992, filed on Aug. 25, 2005.

(56) References Cited

U.S. PATENT DOCUMENTS

| | | | |
|---|---|---|---|
| 2,622,896 A | 12/1952 | Wilkinson | |
| 3,572,456 A | 3/1971 | Healy | |
| 4,020,914 A | 5/1977 | Trautwein | |
| 4,065,144 A | 12/1977 | Winchell | |
| 4,072,325 A * | 2/1978 | Bright et al. | 280/5.521 |
| 4,088,199 A * | 5/1978 | Trautwein | 180/209 |
| 4,159,128 A | 6/1979 | Blaine | |
| 4,375,293 A | 3/1983 | Solbes | |
| 4,487,429 A | 12/1984 | Ruggles | |
| 4,660,853 A | 4/1987 | Jephcott | |
| 4,685,690 A | 8/1987 | Fujita et al. | |
| 4,887,829 A | 12/1989 | Prince | |
| 5,326,121 A * | 7/1994 | Fisher | 280/282 |
| 5,611,555 A | 3/1997 | Vidal | |
| 5,762,351 A | 6/1998 | SooHoo | |
| D407,348 S | 3/1999 | Riley | |
| 6,203,043 B1 | 3/2001 | Lehman | |
| 6,367,824 B1 | 4/2002 | Hayashi | |
| 6,402,174 B1 | 6/2002 | Maurer | |
| 6,471,224 B1 * | 10/2002 | Ziech | 280/93.512 |
| 6,805,362 B1 | 10/2004 | Melcher | |
| 6,817,617 B2 | 11/2004 | Hayashi | |
| 7,044,252 B1 | 5/2006 | Bertrand | |
| 7,090,234 B2 | 8/2006 | Takayanagi et al. | |
| 7,287,611 B2 | 10/2007 | Nagaya | |
| 7,343,997 B1 | 3/2008 | Matthies | |
| 7,377,522 B2 | 5/2008 | MacIsaac | |
| 7,467,802 B2 | 12/2008 | Peng et al. | |
| 7,487,985 B1 | 2/2009 | Mighell | |
| 7,530,419 B2 | 5/2009 | Brudeli | |
| 7,571,787 B2 | 8/2009 | Saiki | |
| 7,591,337 B2 | 9/2009 | Suhre et al. | |
| 7,631,721 B2 | 12/2009 | Hobbs | |
| 7,644,938 B2 | 1/2010 | Yamada | |
| 7,665,742 B2 | 2/2010 | Haerr et al. | |
| 7,665,749 B2 | 2/2010 | Wilcox | |
| 7,850,180 B2 * | 12/2010 | Wilcox | 280/124.103 |
| 7,967,306 B2 | 6/2011 | Mighell | |
| 8,016,302 B1 | 9/2011 | Reeves | |
| 2003/0214113 A1 | 11/2003 | Bank | |
| 2004/0100059 A1 | 5/2004 | Van Den Brink et al. | |
| 2006/0042844 A1 | 3/2006 | Kirkpatrick et al. | |
| 2006/0255550 A1 | 11/2006 | Pfeil et al. | |
| 2007/0126199 A1 | 6/2007 | Peng et al. | |
| 2007/0151780 A1 | 7/2007 | Tonoli et al. | |
| 2007/0176384 A1 * | 8/2007 | Brudeli | 280/124.103 |
| 2007/0182120 A1 | 8/2007 | Tonoli et al. | |
| 2007/0262548 A1 | 11/2007 | Rawlinson | |
| 2007/0262549 A1 | 11/2007 | Haerr et al. | |
| 2008/0185807 A1 | 8/2008 | Takenaka | |
| 2008/0203693 A1 | 8/2008 | Yamada | |
| 2008/0258415 A1 | 10/2008 | Melcher | |
| 2009/0194961 A1 * | 8/2009 | Dieziger | 280/124.103 |
| 2011/0168473 A1 | 7/2011 | Bedard et al. | |

OTHER PUBLICATIONS

Foale, Tony; "Some Technical Aspects of Tilting Trikes"; purportedly published on Mar. 21, 1999; http://www.tonyfoale.com.

Office action mailed Jun. 9, 2008, U.S. Appl. No. 11/507,040, filed Aug. 18, 2006, Inventor Robert Mighell.

Office action mailed Jul. 13, 2010, U.S. Appl. No. 12/367,683, filed Feb. 9, 2009, Inventor Robert Mighell.

Office action mailed Sep. 21, 2011, U.S. Appl. No. 13/169,719, filed Jun. 27, 2011, Inventor Robert Mighell.

* cited by examiner

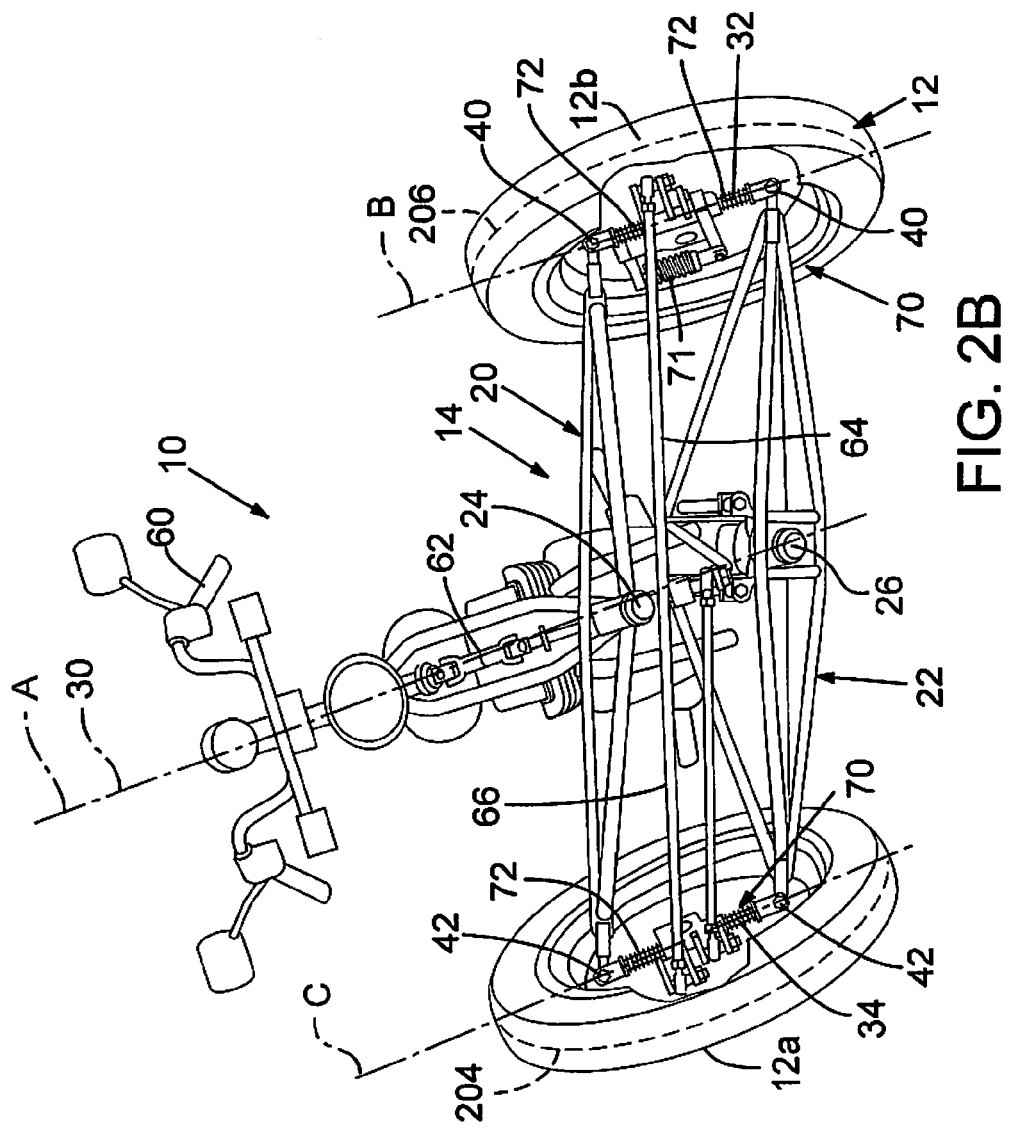

306

TILTING WHEELED VEHICLE

CROSS REFERENCE TO RELATED APPLICATIONS

This application is a continuation of U.S. application Ser. No. 13/460,282, filed Apr. 30, 2012; which is a continuation of U.S. application Ser. No. 13/235,344, filed Sep. 16, 2011; which claims the benefit of U.S. Provisional Application No. 61/383,636, filed on Sep. 16, 2010, and is a continuation-in-part and claims priority to U.S. patent application Ser. No. 13/169,719, filed on Jun. 27, 2011; which is a continuation of U.S. patent application Ser. No. 12/367,683, filed on Feb. 9, 2009, and issued as U.S. Pat. No. 7,967,306 on Jun. 28, 2011; which is a continuation of U.S. patent application Ser. No. 11/507,040, Filed Aug. 18, 2006 and issued as U.S. Pat. No. 7,487,985 on Feb. 10, 2009; which claims priority to U.S. provisional Application No. 60/711,992, filed on Aug. 25, 2005, all of the disclosures of which are hereby incorporated by reference.

FIELD OF THE INVENTION

This invention relates to wheeled vehicles such as motorcycles and the like. More particularly, this invention relates to a stable, preferable three-wheeled vehicle that offers maneuverability characteristics that are substantially similar to those of an in-line, two-wheeled vehicle.

BACKGROUND OF THE INVENTION

Unlike a typical three and four wheeled vehicles, in-line, two-wheeled vehicles, such as motorcycles, bicycles, and the like, allow a rider to lean or tilt while turning without urging the rider toward the outside of the turn. Instead, the rider of the in-line two-wheeled vehicle is pushed straight down into the seat as the free leaning motorcycle balances the vertical gravity vector with the horizontal vector created by going around a corner. The faster the rider goes around a corner, the more the in-line two-wheeled vehicle needs to lean.

But two-wheeled in-line vehicles are limited by only having one front tire as well as having the rider sitting high on the vehicle. The one front tire limits the amount of braking and amount of traction that can be achieved.

Efforts to apply tilting characteristics to three and four-wheeled vehicles have had limited success. Examples of such vehicles and their limitations are discussed in greater detail in an article titled "Some Technical Aspects of Tilting Trikes," by Tony Foale, B. Tech, M. Eng. Sc. dated Mar. 21, 1999, the disclosure of which is hereby incorporated by reference.

In general, these known tilting three-wheeled vehicles are limited by not allowing proper tilt of the vehicle, complex tilting structures that require excessive user interaction, and/or requiring complex control systems to operate effectively.

SUMMARY OF THE INVENTION

Despite the available three-wheeled vehicles, there remains a need for a three-wheeled vehicle that allows leaning substantially similar to that offered by an in-line two-wheeled vehicle, but that does not require complex linkages and/or control systems to operate effectively. In addition to other benefits that will become apparent in the following disclosure, the present invention fulfills these needs.

BRIEF DESCRIPTION OF THE DRAWINGS

FIG. 2B is a front, plan view of the tilting three-wheeled vehicle of FIG. 1 showing a possible leaning position of the vehicle with the front wheels aligned to urge the vehicle in a straight direction.

DETAILED DESCRIPTION OF PREFERRED EMBODIMENTS

Figure 3:
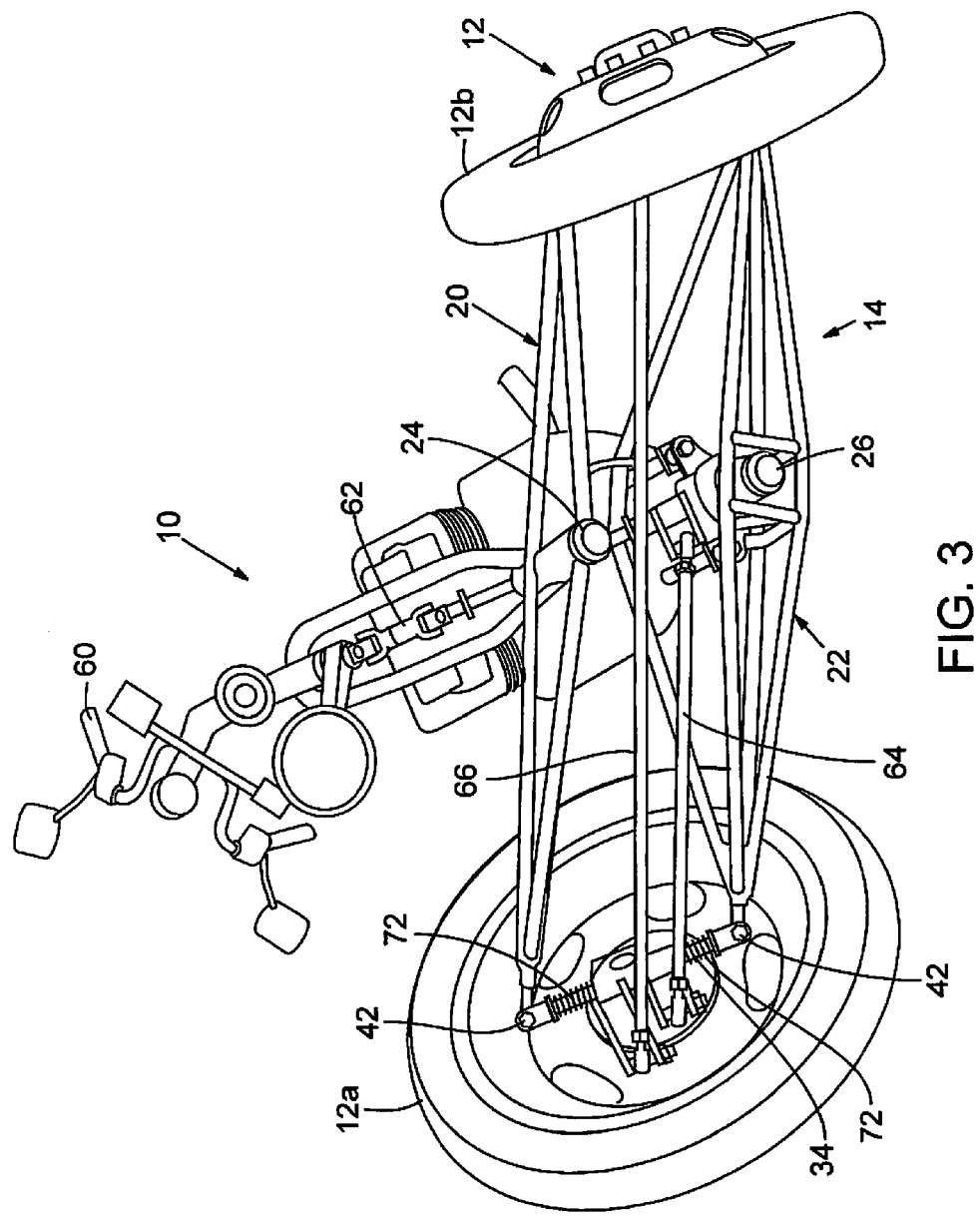
FIG. 3 is a front, plan view of the tilting three-wheeled vehicle of FIG. 1 showing a possible leaning position of the vehicle and the front wheels turned to define a possible right turn.
Figure 4:
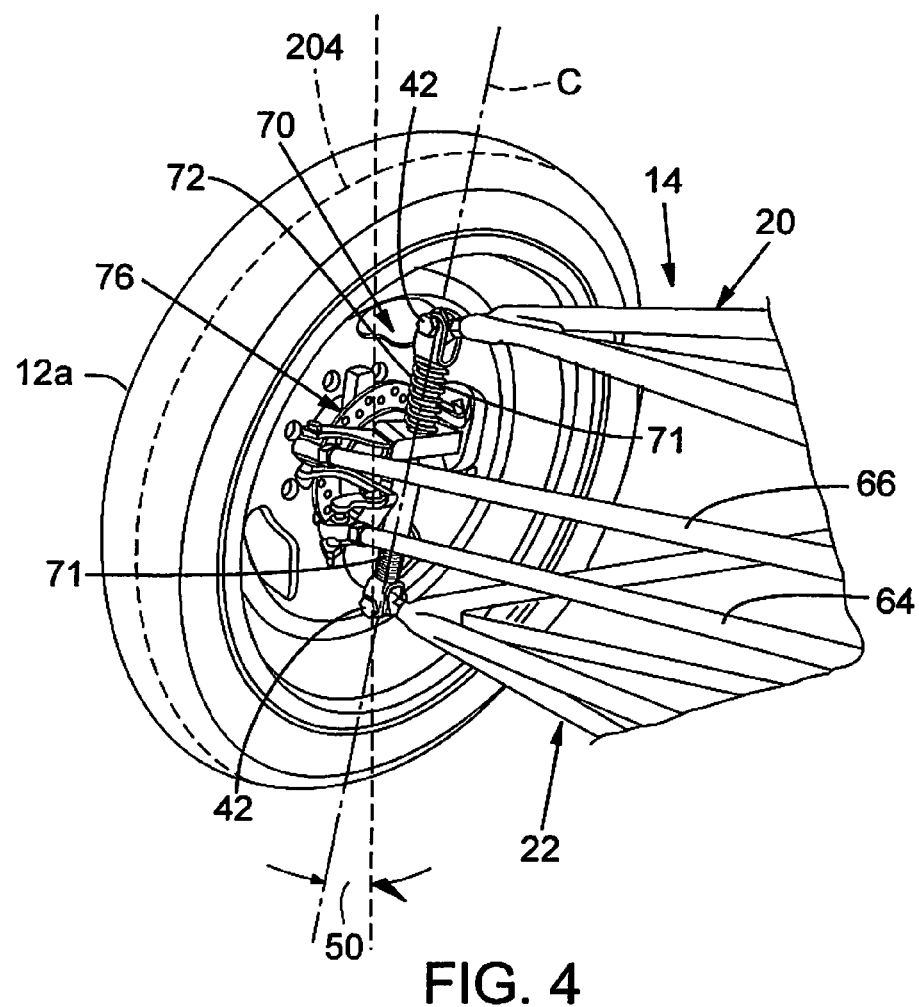
FIG. 4 is a partial, enlarged, isometric view of the right wheel assembly of the tilting three-wheeled vehicle of FIG. 1.
Figure 5:
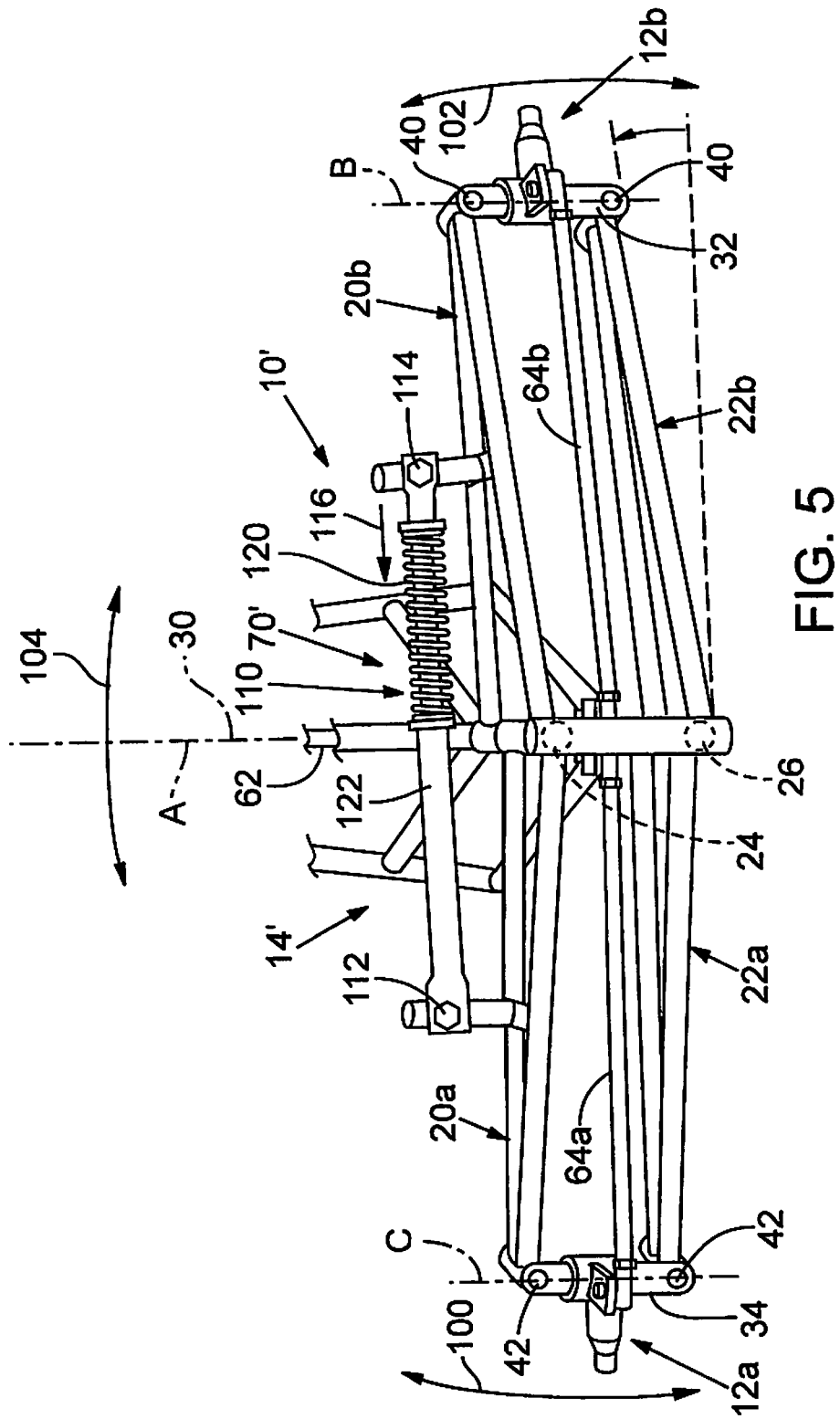
FIG. 5 is a front, isometric view of an alternative linkage for use on a tilting three-wheeled vehicle in accordance with an embodiment of the present invention.
Figure 6:
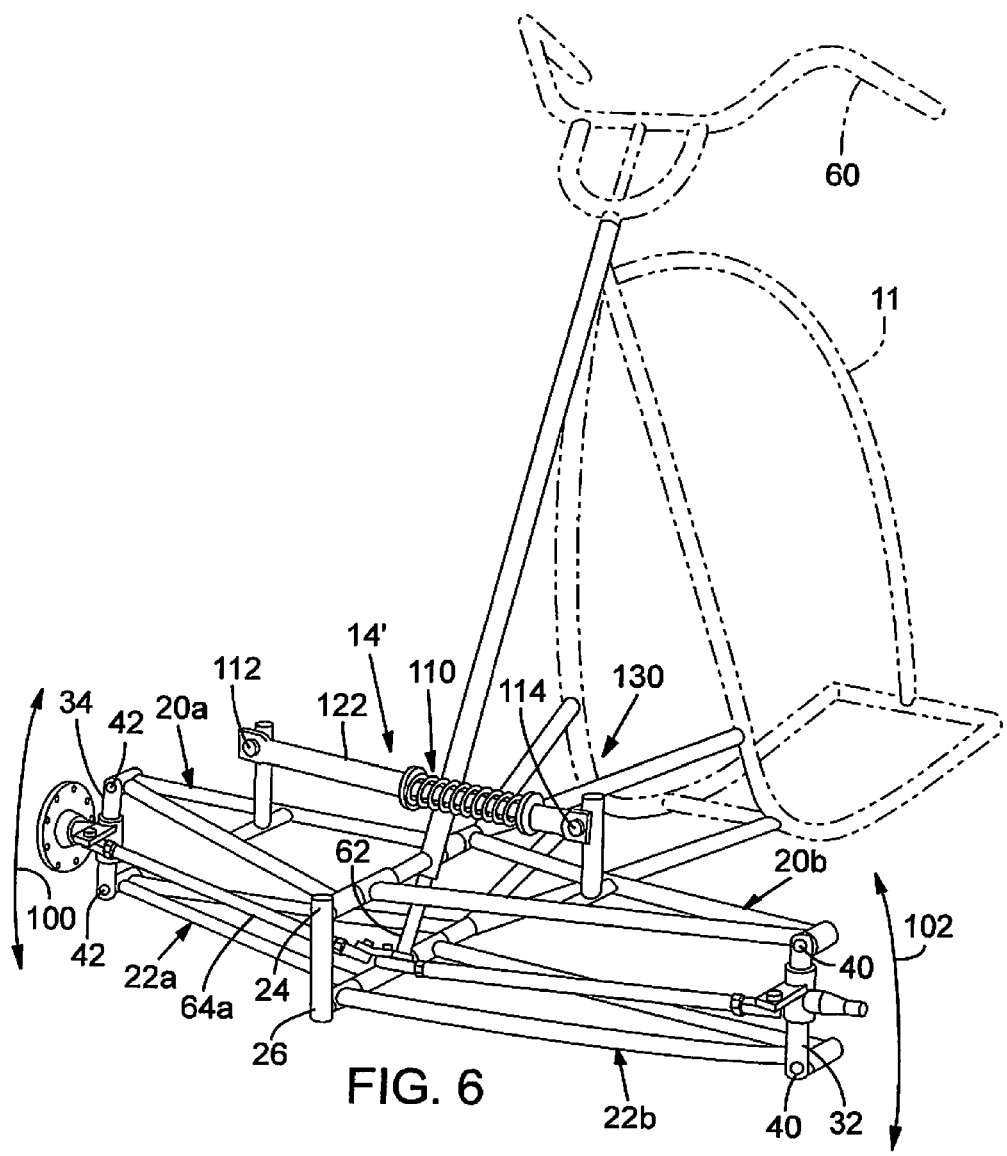
FIG. 6 is a left, isometric view of the alternative linkage of FIG. 5 showing a possible orientation on a motorcycle chassis shown in broken lines.
Figure 7:
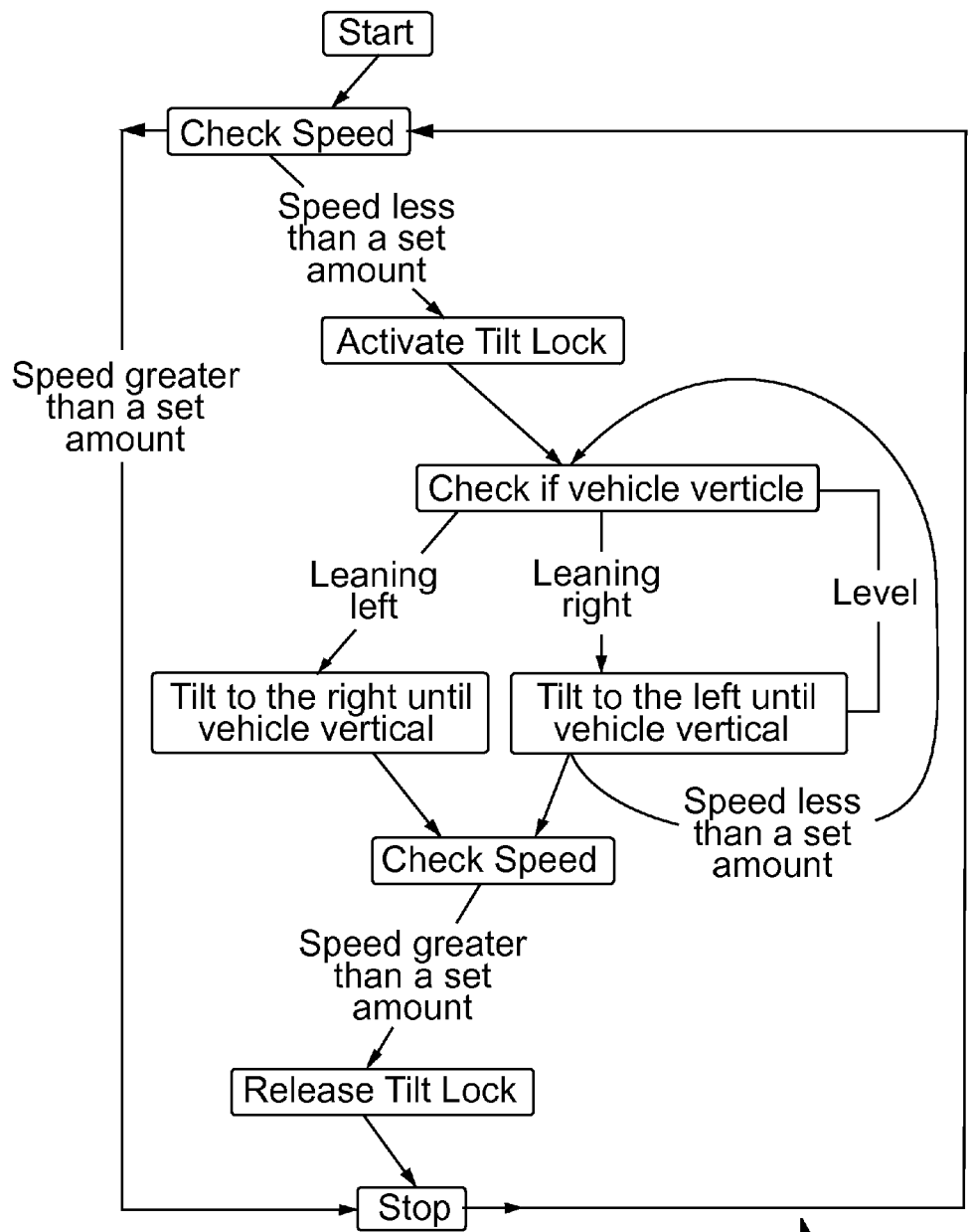
FIG. 7 is a schematic diagram of a possible tilt-locking control logic in accordance with an embodiment of the present invention.
Figure 8:
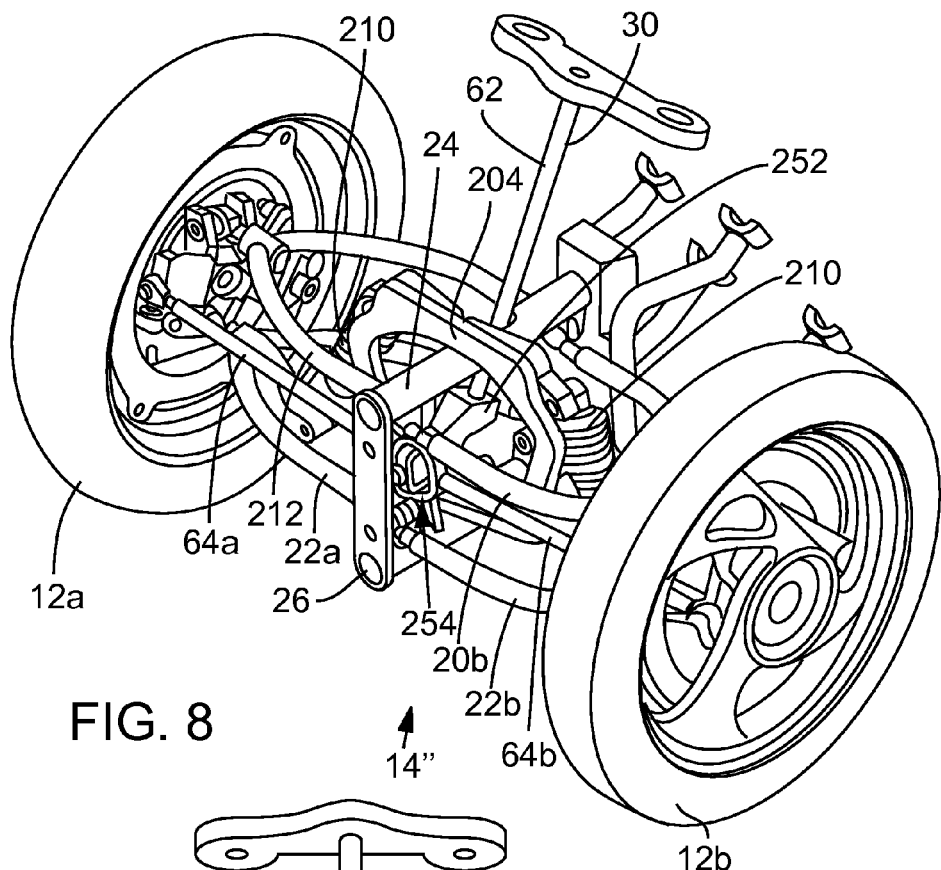
FIG. 8 is a partial top, right isometric view of the front end of a tilting three-wheeled vehicle in accordance with alternative embodiment of the present invention.

A tilting three-wheeled vehicle 10 with an improved pivoting pair of spaced-apart steering wheels 12a, 12b operably secured thereto with a tilting linkage 14 extending between the steering wheels 12a, 12b and the vehicle 10 is disclosed in FIGS. 1-18. A first preferred tilting linkage 14 is shown in FIGS. 1-4, and a second preferred tilting linkage 14' is shown in FIGS. 5 & 6, and a third preferred linkage with optimized suspension is shown in FIG. 8-18. In addition, a preferred tilting lock mechanism (FIG. 18) and related control logic (FIG. 7) is disclosed, and a steering yoke that allows the wheels to be steered throughout the complete tilting range of motion of the vehicle is disclosed in FIGS. 13-15. Each of these embodiments is discussed in greater detail below.

Referring to FIGS. 1-4, the vehicle 10 replaces the front wheel of a two-wheeled in-line vehicle with a the pair of substantially parallel-aligned wheels 12a, 12b joined to the chassis 11 of the vehicle 10 by a linkage 14 that tilts each wheel 12a, 12b substantially similar to the tilt of the vehicle 10 during use.

Figure 1:
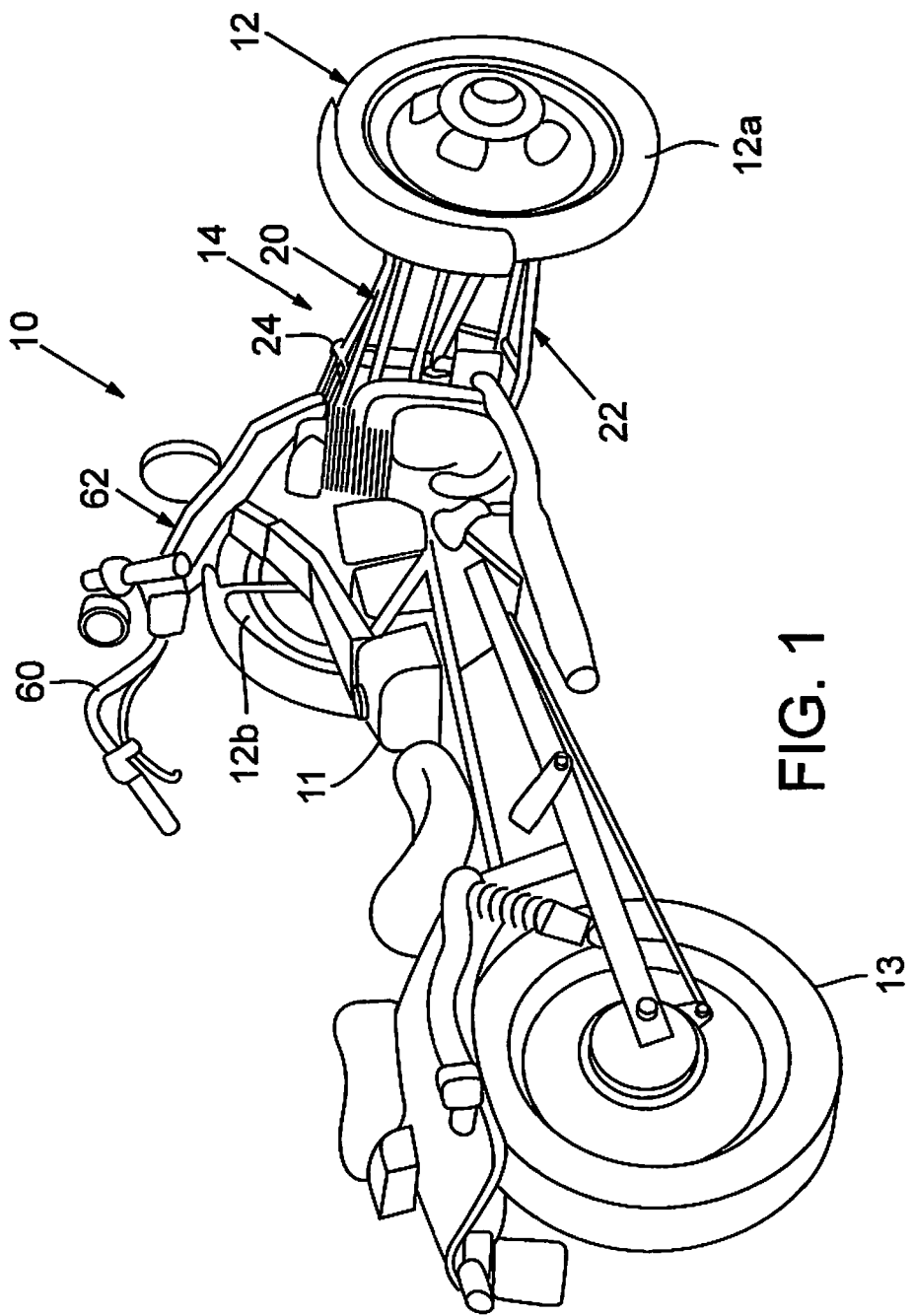
FIG. 1 is a rear, right, isometric view of a tilting three-wheeled vehicle in accordance with an embodiment of the present invention.
Figure 2A:
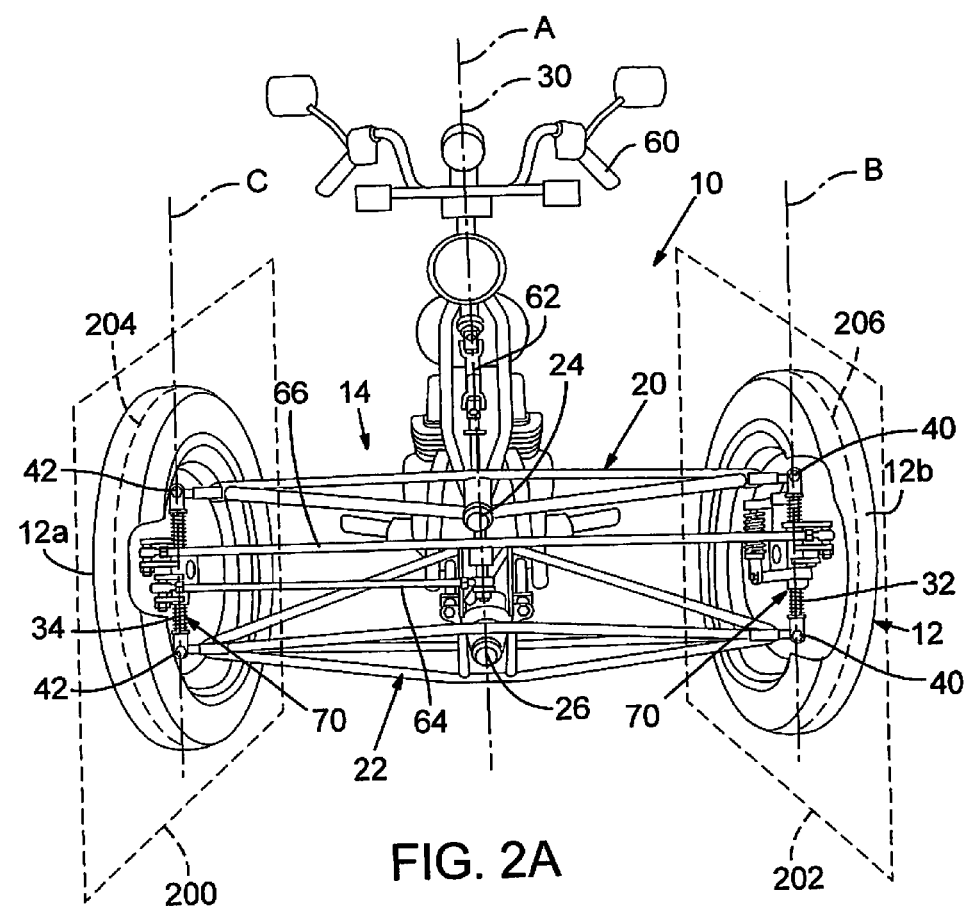
FIG. 2A is a front, plan view of the tilting three-wheeled vehicle of FIG. 1 showing a possible straight position of the vehicle and the front wheels aligned to urge the vehicle in a straight direction.

In one disclosed embodiment best shown in FIG. 2A, the linkage 14 has an upper and lower spaced-apart and substantially elongate cross members 20, 22, respectively, that are each pivotally secured to the front of the vehicle at respective pivots 24, 26. The upper and lower spaced apart cross-members 20, 22, are substantially parallelly aligned, with the pivots 24, 26 for each cross-member being substantially aligned on the steering axis 30 of the vehicle 10.

Auxiliary steering shafts 32, 34, which are also referred to as "kingpins" herein, are operably secured to the distal ends of each respective cross member defining a left steering shaft 32 extending between the left distal ends 40 of the upper and lower cross-members 20, 22 and a right steering shaft 34 extending between the right distal ends 42 of the upper and lower cross-members 20, 22. The left and right steering shafts 32, 34 are substantially parallelly aligned with each other and the steering axis 30 of the vehicle and have substantially the same caster angle 50 (FIG. 4).

In one embodiment, the king pins preferably do not go through the center of their respective wheel axis but rather are set back toward the rear of the vehicle approximately 2.5 inches to allow the contact patch of the tire to be slightly behind an imaginary line that goes down the center of the king pin. Alternatively, no offset need be provided so long as each wheel's caster angle 50 (FIG. 4) is adjusted accordingly.

Each wheel 12a, 12b of the pair of wheels 12 is operably secured to one of the steering shafts 32, 34. The left wheel 12b is operably secured to the left sheering shaft 32 and the right wheel 12a is operably secured to the right steering shaft 34 so as to allow each wheel 12a, 12b to turn about its respective steering axis B, C. Accordingly, the steering axes B & C of the left and right wheel 12a, 12b are substantially parallelly aligned with the steering axis 30 of the vehicle 20 and each wheel 12a, 12b is able to turn about its respective steering shaft 32, 34. More preferably, each steering shaft 32, 34 is aligned so that its respective steering axis B, C is coincident with a substantially vertical plane 200, 202 intersecting the longitudinal center 204, 206 of the respective wheel as best shown in FIG. 2A.

Preferably, the handlebars 60 of the vehicle 10 operably engage a primary steering shaft 62 (FIG. 3), which defines the steering axis 30 of the vehicle and a substantially vertical plane A (FIGS. 2A, 2B, and 5) extending therethrough. A first tie rod 64 extends from a lower portion of the steering shaft 62 to the right wheel 12a, and a second tie rod 66 extends from the right wheel 12a to the left wheel 12b as shown. Accordingly, when a rider turns the handlebars 60, the steering shaft 62 rotates in the commanded direction thereby urging the first tie rod 64 to turn the right wheel 12a about the right steering shaft 34. The second tie rod 66 simultaneously urges the left wheel 12b to pivot in the same commanded direction about the left steering shaft 32. Accordingly, it can be appreciated that the vehicle may be steered in substantially the same manner as a conventional in-line two-wheeled vehicle.

Preferably and referring to FIGS. 2A & 4, a suspension system 70, such as a spring 72 and/or dampener 71, operably engage each wheel 12a, 12b as shown. An alternative preferred linkage system with suspension system 70' is shown in FIGS. 14-30. An upper pivot frame 24 and lower pivot frame 26 are aligned along the steering axis 30 of the vehicle. Cross members 20a, 20b, 22a, 22b, extend from the upper and lower pivot frames to their respective wheels 12a, 12b as shown. A lower suspension frame is pivotally secured to the lower pivot frame and a C-shaped suspension support straddles the upper pivot frame and is pivotally secured to the lower suspension support. Suspension elements, such as a spring and/or dampener extend from the C-shaped suspension support to suspension mounts at each wheel 12a, 12b. Accordingly, the suspension elements remain in their neutral positions throughout the tilting and turning range of motion of the vehicle as best shown in FIGS. 2B, 3, 11, and 16.

Figure 13:
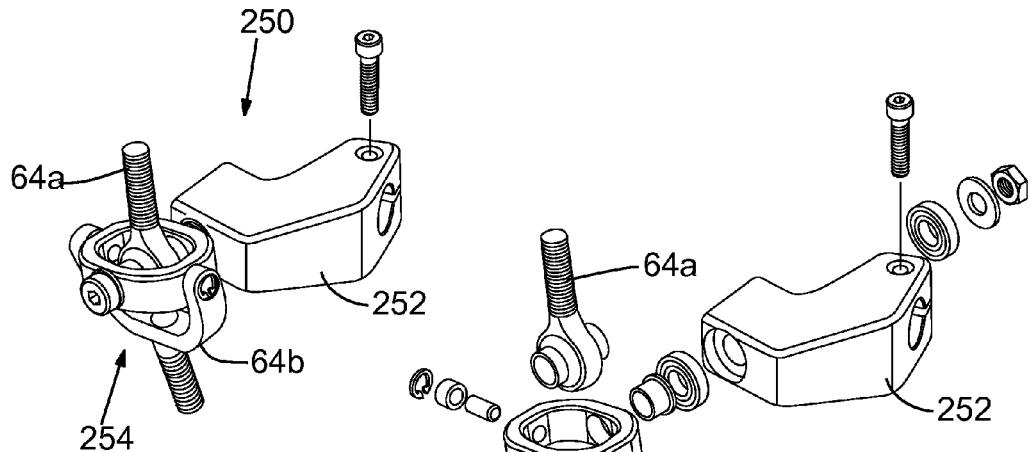
FIG. 13 is an enlarged, isometric view of a steering system universal joint installed on the lilting three-wheeled vehicle of FIG. 8 and in accordance with an embodiment of the present invention.
Figure 14:
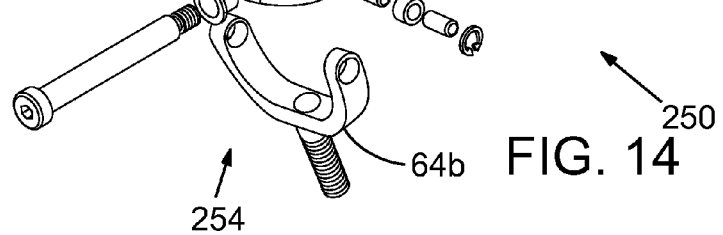
FIG. 14 is an exploded, isometric view of the steering system universal joint of FIG. 13.
Figure 15:
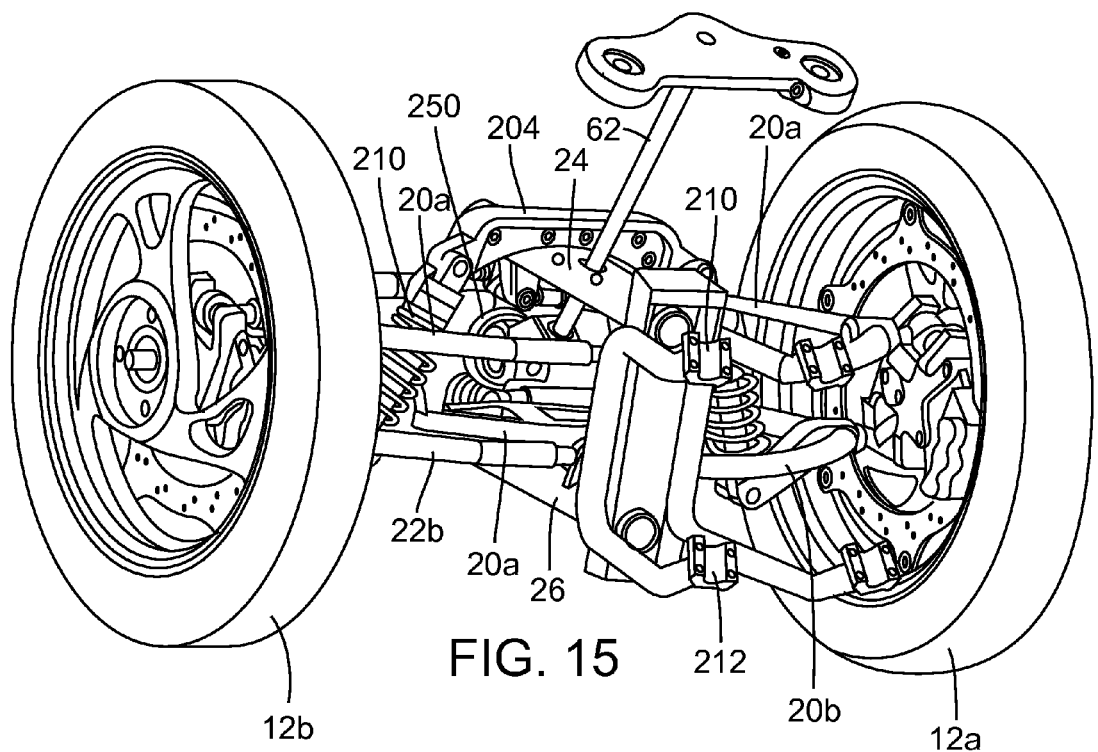
FIG. 15 is a rear, right isometric view of the three-wheeled vehicle of FIG. 8.

More preferably, the steering system components are configured so as to provide conventional Ackermann steering. Referring to FIGS. 13-15 a universal joint steering yoke 250 operably connecting a steering shaft 62 (FIG. 15) to the wheels (12a, 12b) with tie rods (64a, 64b). This joint allows each front wheel to be steered by the handlebar without compromising steering feel or force on the rider throughout the entire tilting range of motion of the vehicle.

The present invention allows a three-wheeled vehicle to lean substantially similarly to an in-line two-wheeled vehicle. Referring to FIGS. 2A, 2B and 3, when the steering axis 30 of the vehicle is aligned substantially vertically as shown in FIG. 2A, both the left wheel 12b and right wheel 12a are aligned substantially vertically. However, during turning operations, such as a right turn shown in FIG. 3, when the vehicle naturally leans into the turn, the left and right wheels also lean by substantially the same amount. Referring to FIG. 2B, a lean to the right will also cause the left and right wheels to lean right by substantially the same amount.

Referring to FIGS. 5 & 6, an alternative preferred tilting linkage 14' is disclosed. In order to reduce undue repetition, like elements between this embodiment and the previously disclosed tilting linkage 14 are like numbered.

The alternative preferred linkage 14' of FIGS. 5 & 6 preferably has a pair of upper cross members 20a, 20b and a vertically spaced apart pair of lower cross members 22a, 22b respectively. Each cross member 20a, 20b, 22a, 22c is pivotally secured to the front of the vehicle at respective, substantially horizontal, pivot shafts 24', 26'. Namely, cross members 20a, 20b are pivotally secured to pivot shaft 24' and lower cross members 22a, 22b are pivotally secured to pivot shaft 26'. The pivot shafts 24', 26' are positioned substantially vertically with respect to each other along the steering axis 30 and spaced apart from each other as best shown in FIG. 5. Accordingly, the distal ends of upper cross member 20a and lower cross member 22a move substantially in the directions of arrow 100 and the distal ends of upper cross member 20b and lower cross member 22b move substantially in the directions of arrows 102 as the steering shaft tilts about arrow 104.

Auxiliary steering shafts 32, 34, which are also referred to as "kingpins" herein, are operably secured to the distal ends of each respective cross member defining a left steering shaft 32 extending between the left distal ends 40 of the upper and lower cross-members 20b, 22b and a right steering shaft 34 extending between the distal ends 40 of the upper and lower cross-members 20a, 22a. The left and right steering shafts 32, 34 are substantially parallelly aligned with each other.

If desired, the caster angle 50 (FIG. 4) of the left and right steering shafts 32, 34 can differ from the caster angle of the steering axis 30. More preferably, the castor angle 50 of the left and right steering shafts 32, 34 is selected so that there is about a 2.5 inch to 3.5 inch trail, defined as the distant between the contact patch of the respective wheel 12a, 12b with the ground and the contact point with the ground of an imaginary line extending from the respective steering shaft 32, 34. More preferably, the trail for each wheel 12a, 12b is about 3 inches. It can be appreciated that since the steering axis 30 is separate from the kingpins, any steering axis angle may be used to optimize driver handlebar positioning while still allowing for the optimizing each wheel's caster angle.

Each wheel 12a, 12b of the pair of wheels 12 is operably secured to one of the steering shafts 32, 34. The left wheel 12b is operably secured to the left sheering shaft 32 and the right wheel 12a is operably secured to the right steering shaft 34 so as to allow each wheel 12a, 12b to turn about its respective steering axis B, C. Accordingly, the planes of the left and right wheel 12a, 12b are substantially parallely aligned with the steering axis 30 of the vehicle 20 and each wheel 12a, 12b is able to turn about its respective steering shaft 32, 34.

Preferably, the handlebars 60 of the vehicle 10 operably engage a primary steering shaft 62 (FIG. 5), which defines the steering axis 30 of the vehicle. A first tie rod 64a extends from a lower portion of the steering shaft 62 to operably engage the right wheel 12a, and a second tie rod 64b extends from the lower portion of the steering shaft 62 to operably engage the left wheel 12b as shown. Accordingly, when a rider turns the handlebars 60, the steering shaft 62 rotates in the commanded direction thereby urging the first tie rods 64a, 64b to turn their respective wheels in the commanded direction. Accordingly, it can be appreciated that the vehicle may be steered in substantially the same manner as a conventional in-line two-wheeled vehicle.

Preferably and referring to FIGS. 5 & 6, a suspension system 70', such as a spring 120 and/or dampener 122, operably engages the linkage 14'. More preferably, the spring 120 and dampener 123 are pivotally secured to both the left and right portions of the linkage 14' at pivots 114, 112, respectively as shown. Accordingly, both the left and right portions of the linkage 14' are independently movable in the directions of arrows 102, 100, respectively, while also being urged to a neutral, substantially horizontal configuration with respect to each other.

More preferably, the tie bars 64, 66 are sized to as to allow the outer wheel in a given turn to turn slightly less in the commanded direction than the inner wheel of the turn.

Figure 9:
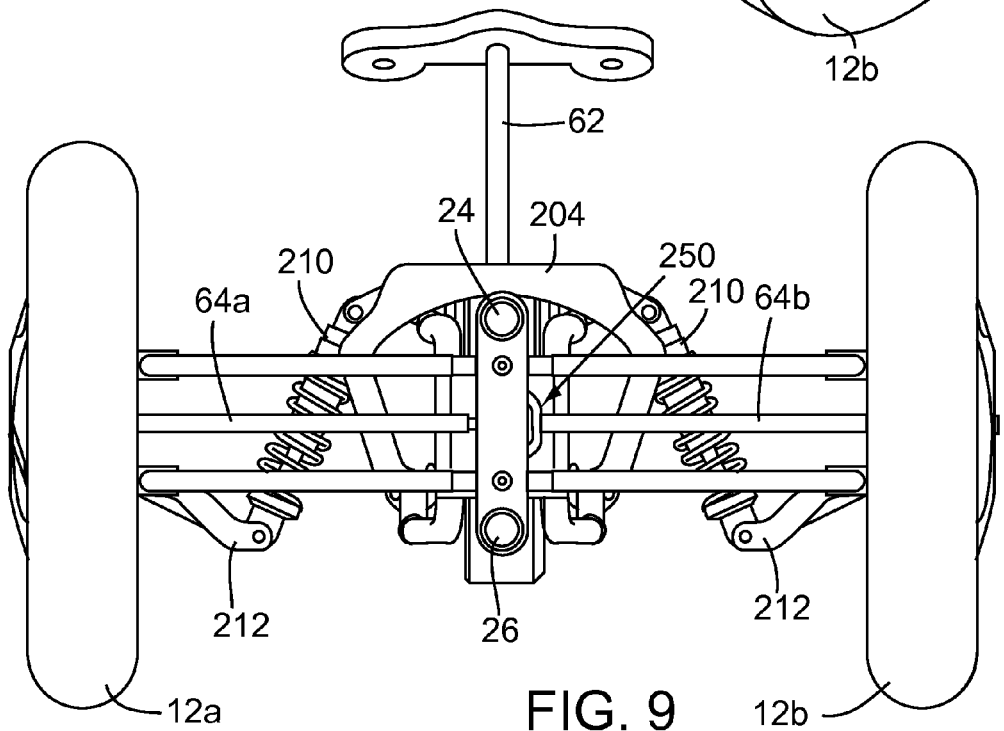
FIG. 9 is a front view of the tilting three-wheeled vehicle of FIG. 8.
Figure 10:
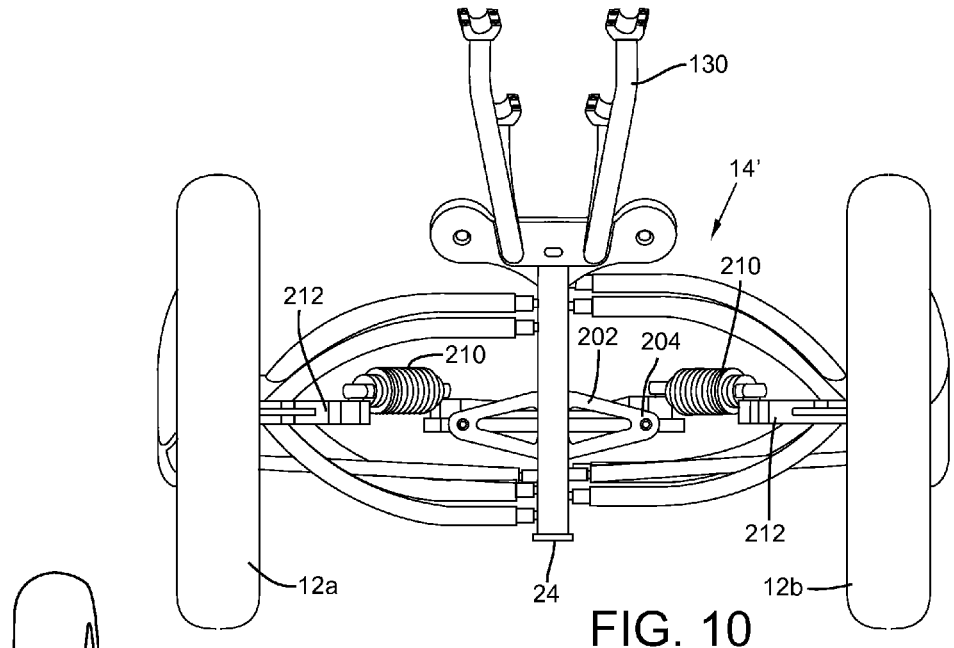
FIG. 10 is a bottom view of the tilting three-wheeled vehicle of FIG. 8
Figure 11:
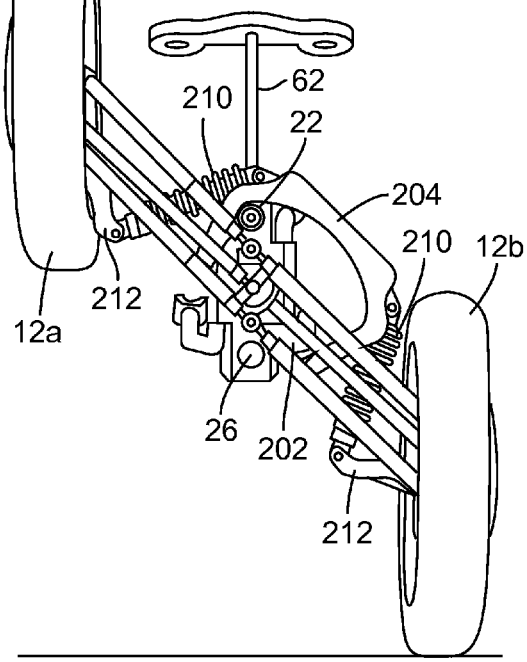
FIG. 11 is a partial front view of the tilting three-wheeled vehicle of FIG. 8 showing a possible tilted position of the vehicle.
Figure 12:
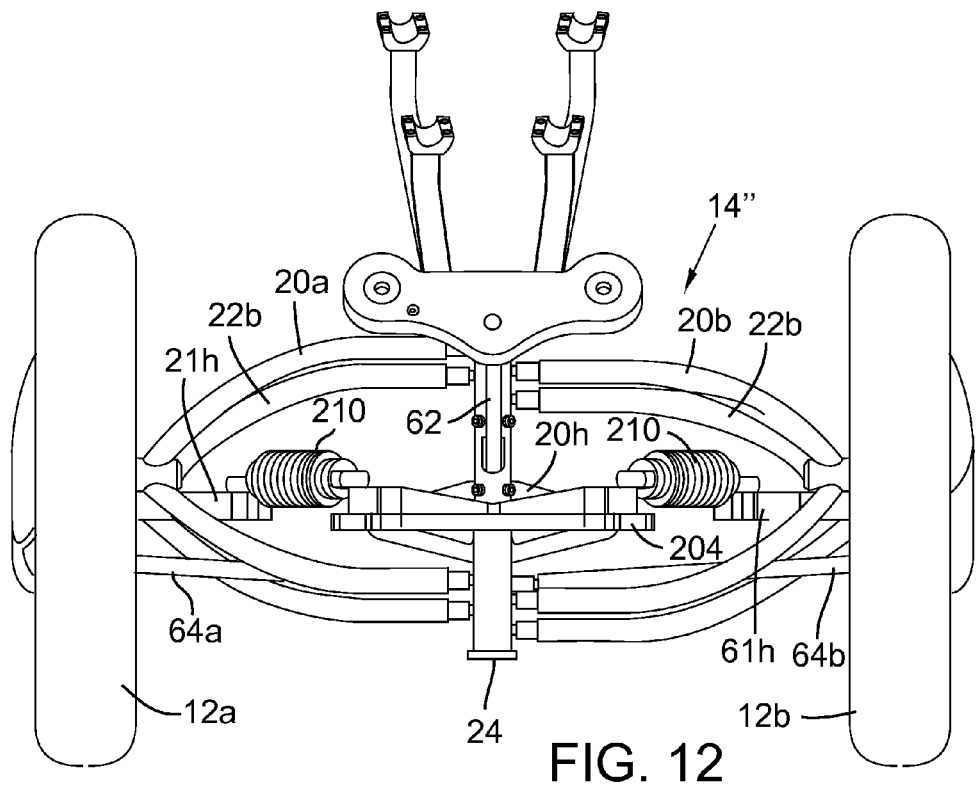
FIG. 12 is a top view of the tilting three-wheeled vehicle of FIG. 8.
Figure 16:
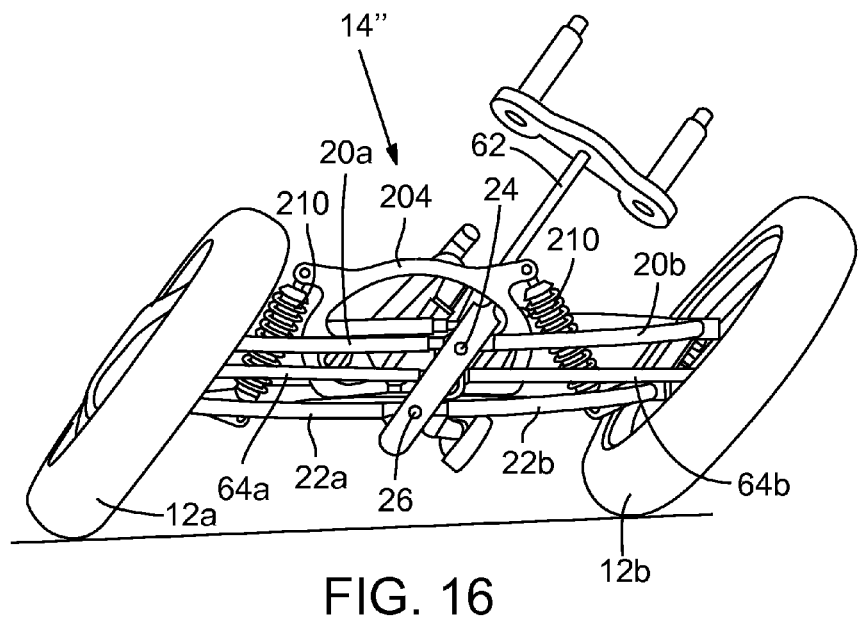
FIG. 16 is a front view of the three-wheeled vehicle of FIG. 8 showing a possible tilted position of the vehicle.
Figure 17:
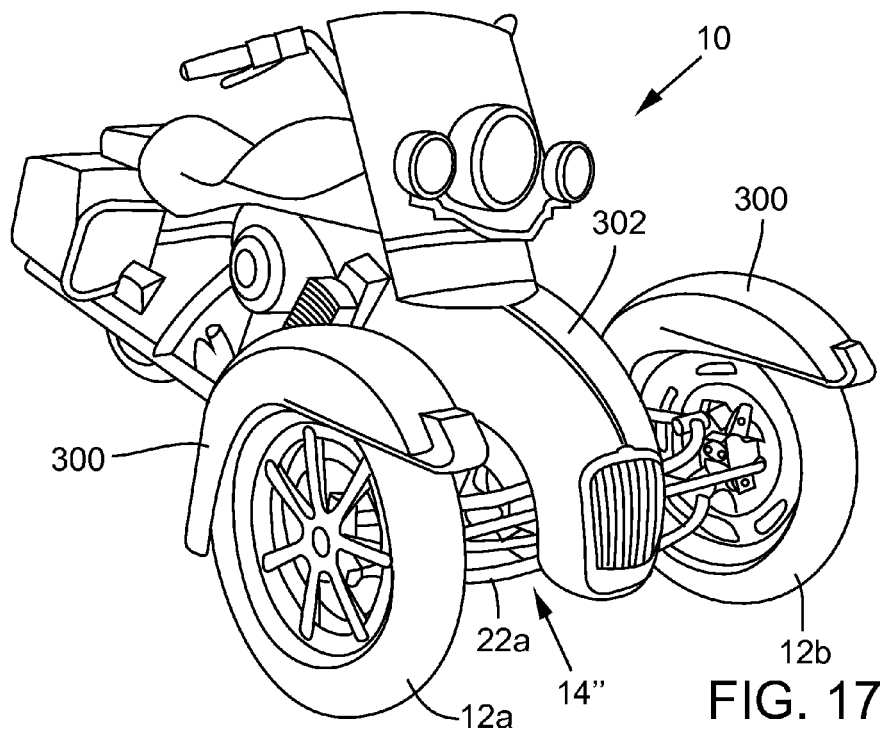
FIG. 17 is a front, right view of the three-wheeled vehicle of FIG. 8 showing a possible fender and front end cover arrangement.
Figure 18:
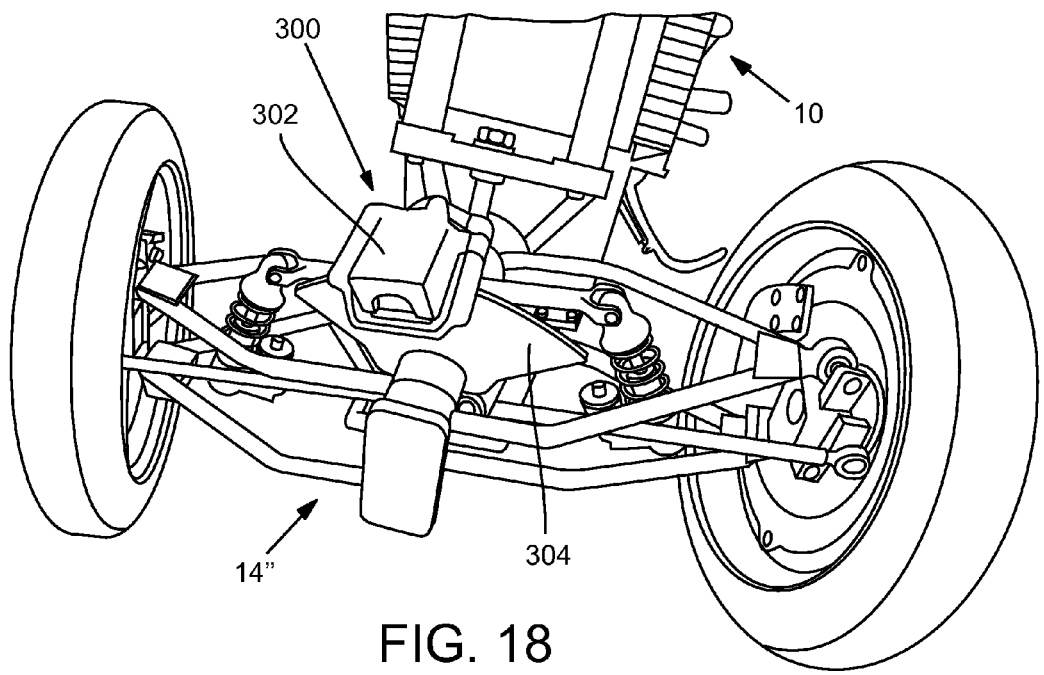
FIG. 18 is a front, left isometric view of the three-wheeled vehicle of FIG. 8 showing a possible hydraulic disk tilt lock structure.

Referring to FIGS. 8-12 and 15 and 16, an alternative linkage structure providing constant dampening suspension force throughout the entire tilting range of motion of the vehicle is shown. A c-shaped member straddles the vehicle frame and operably connects left and right suspension elements 210 to the wheels 12a, 12b. This orientation allows the force on the suspension elements 210 to remain constant when the vehicle is tilted as shown in FIG. 16 or standing straight up as shown in FIG. 9, and with the wheels 12a, 12b turned as shown in FIG. 18 or pointing straight as shown in FIG. 9.

The disclosed embodiments allow positioning of a driver low in the vehicle 10 behind the engine. Preferably, placing the engine to the rear would create a vehicle too light in the front where most of the braking occurs and would can make the vehicle prone to oversteering issues which would lead to spin outs. Placing the motor in the front would most likely lead to an understeering vehicle, which would be a safer situation when driving at the vehicle's limits. Lowering of the vehicle's center of gravity is universally seen as desirable and reduces the chance of the vehicle flipping over which is very difficult to do on a motorcycle or like vehicle unless the wheels encounter some non movable object such as a curb or rock. This characteristic is know by motorcyclists as "high-siding" and tends to sling the rider up over the top of their bike. Lowering the vehicle's center of gravity will allow the vehicle to shift from a left to right turn faster than a similar vehicle with a higher center of gravity.

This three-wheeled vehicle 10 of the present invention allows it to steer and maneuver like a conventional in-line two-wheeled vehicle but have better braking and traction capabilities. With the driver sifting low in the vehicle like in a sports car, he would not have the uncomfortable feeling of being tossed left or right when cornering hard.

There are two ways to achieve a leaning vehicle. One way is to have the vehicle "free lean" such as a motorcycle where the steering input is the only force needed to create the lean. A free leaning vehicle needs to be able to lean at up to a 45-50 degree angle to allow for a maximum lean required during a fast tight turn. If the free leaning vehicle is mechanically challenged in that it cannot achieve such a lean without part of the chassis hitting the pavement or some binding occurring in the leaning mechanism, then the forces are not adequately balanced and the driver begins to feel the force of being toss to the outside. This also causes the force on the tires to no longer be straight down and can cause the vehicle to slide as motorcycles do not have much of a contact patch on the pavement and are not designed to handle side load forces.

The other way to achieve a leaning vehicle relies on complex control systems such as computer input from steering sensors to command hydraulic actuators as needed to force the vehicle to lean.

The present invention relies on a free leaning design. It has been designed to have no clearance issues up to 45 degrees so it should be able to lean up to all angles required by the driver regardless of speed or sharpness of turn. It will steer like a motorcycle and require use of countersteering to control. This method of steering is familiar to all motorcyclists who are able to switch back and forth between steering a car and a motorcycle with no confusion. Anyone truly wanting to learn to drive a motorcycle is not put off by the fact that it steers differently than a car. In fact, many motorcyclists do not even realize that they are using countersteering to control their bike and just do it intuitively. People who have not driven motorcycles before may find the vehicle difficult to control until they learn how to steer it properly.

The preferred embodiment of the present invention is also far less expensive and complicated to manufacture than any forced leaning vehicle.

With increased up front traction and braking capabilities of a motorcycle combined with a lower center of gravity than a motorcycle offered by at least one embodiment of the present invention, the vehicle of the present invention will outperform motorcycles with the same size engine despite being slightly heavier due to the additional steering linkage and additional wheel.

Known tilting vehicles mislocate the kingpins which are offset toward the center of the vehicle similar to how an automobile's steering is built. By centering the kingpin left to right inside the wheel of a motorcycle type tire and rim and bringing the kingpin inclination angle (or known as Steering Inclination Angle (SIA) or Steering Axis Inclination (SAI)) to 0 degrees, the present invention achieves a substantially 0 scrub radius when the vehicle is tracking in a straight line which is substantially similar to how a motorcycle's steering works. The scrub radius will then shift from positive to negative as the vehicle leans with one side being positive and the other being negative at the same lean angle.

The castor of the kingpins can also mimic that of a motorcycle and be in the range of 24-30 degrees. Sport motorcycles have a smaller castor angle while "choppers" have a lot more. The first disclosed embodiment has a middle of the range 27 degrees. The second disclosed embodiment has a preferred castor angle of about 15 degrees. Of course, other caster angles could be used depending on a particular application.

The camber is preferably set up to be slightly positive. Accordingly, the inside tire preferably leans slightly more since it is following a smaller radius. While traveling straight ahead, both tires will want to pull slightly to the outside but their forces should offset each other. At slower speeds (i.e. 1-5 mph), the rider will turn the steering to the right in order to turn the vehicle right. At speeds higher than that, the effect of countersteering kicks in and the rider must turn the steering to the left in order for the vehicle to go to the right.

Currently, unless supported by the driver's feet or by a kickstand, the vehicle 10 of the present invention remains free-leaning, like a motorcycle. Accordingly, it will tend to tilt sideways when operating at very slow speeds, when stopped, and when parked. Accordingly, it can fall-over, just like a motorcycle, unless supported by the rider or a kickstand.

If desired, the vehicle can be configured to reduce or eliminate freeleaning when stopped or operated at slow speeds. For example, the front of the vehicle can be temporarily and automatically locked at a commanded, straight position at slow speeds and when stopped with no pivoting allowed along pivots 24 and 26. An exemplar control logic for activation of the tilting lock is shown schematically in FIG. 7.

Such control systems for detecting speed and activating a controller to limit movement are known. For example, the speed control could be activated by a connection to a traditional speedometer measuring the rotation of the wheel since the vehicle would lock up anytime the brakes were applied hard enough to lock up the wheels. Alternatively, vehicle speed can be monitored by an on-board GPS system, a radar system, a radio frequency transmission system or the like that would measure the vehicle's true speed and apply a mechanical lock 300 (FIG. 18) once the speed of the vehicle reaches less than say 3 mph. An exemplar mechanical lock 300 featuring a hydraulic brake 302 operably secured between the vehicle frame and the lilting linkage is shown in FIG. 18. With such a system installed, the driver would not have to put his or her feet on the ground once the vehicle came to a stop.

Moreover, the tilting linkage 14 and 14' can include a frame portion 130 adapted to fit onto the front end of a conventional in-line two-wheeled vehicle such as a conventional motor cycle or the like. Such frame would include conventional fittings and the like to allow the steering shaft 30 to connect to the existing handlebar system of the conventional in-line two-wheeled vehicle.

In view of the wide variety of embodiments to which the principles of the invention can be applied, it should be apparent that the detailed embodiments are illustrative only and should not be taken as limiting the scope of the invention. For example, although the disclosed embodiment positions the pair of wheels 12a, 12b on the front of the vehicle, the principles of this invention would also work with the pair of wheels 12a, 12b replacing the rear wheel of an in-line two-wheeled vehicle. Similarly, a four-wheeled vehicle with one or both of the pairs of wheels configured as described could also operate effectively. Rather, the claimed invention includes all such modifications as may come within the scope of the claims and equivalents thereto.

I claim:

1. A tilting wheeled vehicle having:
   an elongated frame defining a frame plane extending substantially vertically along a longitudinal centerline of said frame, said frame tiltable from side-to-side defining a range of movement of said frame;
   a first tilting linkage operably secured to the frame at a first mounting pivot and a second mounting pivot, said first tilting linkage operably securing a first wheel to said frame at said first and second mounting pivots, said first and second mounting pivots spaced apart from each other and aligned within said frame plane;
   said first wheel pivotally secured to said first linkage defining a first pivot axis and having a substantially vertical longitudinal centerline defining a first wheel plane that intersects said substantially vertical longitudinal centerline, said first pivot axis substantially intersecting said first wheel plane;
   a second tilting linkage operably secured to the frame at said first mounting pivot and said second mounting pivot such that said first and second tilting linkages pivot about said frame plane, said second tilting linkage operably securing a second wheel to said frame at said first and second mounting pivots, said first and second tilting linkages independently pivotable about said first and second mounting pivots, said second wheel spaced apart from and aligned substantially parallel to said first wheel;
   said second wheel pivotally secured to said second linkage defining a second pivot axis and having a second substantially vertical longitudinal centerline defining a second wheel plane that intersects said second pivot axis substantially intersecting said second wheel plane; and,
   said first pivot axis and said second pivot axis aligned substantially parallel to said frame plane through said range of movement of said frame.

2. The tilting wheeled vehicle of claim 1, wherein said frame has a front, a back, a left side, and a right side and said frame is tiltable so that said frame plane may tilt in the direction between said left side and said right side, and further including
   a rear wheel operably secured toward the back of said frame;
   said first and second tilting linkages operably secured toward the front of said frame thereby defining a tilting three-wheeled vehicle.

3. The titling wheeled vehicle of claim 2, wherein said first tilting linkage has
   a first upper arm pivotally secured to said first mounting pivot and having a first distal end;
   a first lower arm pivotally secured to said second mounting pivot and having a second distal end;
   a first kingpin extending between said first upper arm and said first lower arm toward said first and second distal ends, said first kingpin aligned substantially parallel to the frame plane of the vehicle; and,
   said first wheel operably secured to said first kingpin.

4. The tilting wheeled vehicle of claim 3, wherein said second linkage has a second upper arm pivotally secured to said first mounting pivot, said second upper arm has an opposite third distal end and said second linkage has a second lower arm pivotally secured to the second mounting pivot, said second lower arm has an opposite fourth distal end, and further including:
   a second kingpin extending between said second upper arm and said second lower arm toward said third and fourth distal ends, said second kingpin aligned substantially parallel to the frame plane of the vehicle and said first kingpin; and,
   said second wheel is operably secured to said second kingpin.

5. The tilting vehicle of claim 1, wherein said vehicle is a conventional motorcycle and said first and second linkages are detachably secured to said motorcycle.

6. The tilting vehicle of claim 2, further including a steering shaft operably secured to said frame, said steering shaft aligned substantially parallel to said frame plane.

7. The tilting vehicle of claim 6, further including a handle bar operably secured to said steering shaft, and a steering linkage extending between said steering shaft and said first and second wheels so as to allow a rider to turn said first and second wheels about said first and second pivot axes, respectively, by turning the handle bar about said steering shaft thereby steering the vehicle.

8. The tiling vehicle of claim 3, further including a suspension system operably secured to said first and second linkages.

9. The tilting vehicle of claim 8, wherein said suspension system includes a compression spring operably positioned between said first wheel and said first kingpin.

* * * * *